United States Patent
Thaler, III et al.

(10) Patent No.: US 11,190,356 B2
(45) Date of Patent: Nov. 30, 2021

(54) SECURE POLICY INGESTION INTO TRUSTED EXECUTION ENVIRONMENTS

(71) Applicant: Microsoft Technology Licensing, LLC, Redmond, WA (US)

(72) Inventors: David Garfield Thaler, III, Redmond, WA (US); Stefan Thom, Snohomish, WA (US); Brian Clifford Telfer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 16/297,162

(22) Filed: Mar. 8, 2019

(65) Prior Publication Data

US 2019/0268161 A1 Aug. 29, 2019

Related U.S. Application Data (63) Continuation-in-part of application No. 15/958,993, filed on Apr. 20, 2018, now Pat. No. 10,872,153, and (Continued)

(51) Int. Cl.
*H04L 9/32* (2006.01)
*G06F 21/57* (2013.01)

(52) U.S. Cl.
CPC ............ *H04L 9/3234* (2013.01); *G06F 21/57* (2013.01); *H04L 9/3226* (2013.01); *H04L 9/3247* (2013.01); *H04L 2209/127* (2013.01)

(58) Field of Classification Search
CPC ... H04L 9/3234; H04L 9/3226; H04L 9/3247; H04L 2209/127; G06F 21/57
See application file for complete search history.

(56) References Cited

U.S. PATENT DOCUMENTS 6,834,351 B1  12/2004  Kabenjian
7,380,276 B2   5/2008  Shah et al.
(Continued)

FOREIGN PATENT DOCUMENTS

CN  107533622 A  1/2018

OTHER PUBLICATIONS

Beekman et al., Improving Cloud Security using Secure Enclaves, Jan. 1, 2016, UC Berkley Electronic Thesis and Dissertations, p. 1-61). (Year: 2016).*

(Continued)

*Primary Examiner* — Nelson S. Giddins
(74) *Attorney, Agent, or Firm* — Mark K. Young; Mayer & Williams, PC (57) ABSTRACT

Before a composition is ingested into a runtime environment at a runtime device, the composition may be verified at an authoring trusted execution environment (TEE) operating on an authoring device. A user can operate an untrusted computing platform (e.g., a personal computer, laptop computer, tablet computer, etc.) to write code, generate data, or create some other composition. Since this composition is created on an untrusted device, the authoring TEE may output the composition on a trusted peripheral device to a user for review and approval. Responsive to receiving approval at the trusted peripheral device, the authoring TEE can sign the composition with a local key and forward the composition for execution by the runtime device. The signature can be utilized by the runtime device to prove that it was reviewed and verified by an authorized user operating the authoring device.

20 Claims, 10 Drawing Sheets

Related U.S. Application Data a continuation-in-part of application No. 15/934,489, filed on Mar. 23, 2018, which is a continuation-in-part of application No. 15/934,489, filed on Mar. 23, 2018.

(60) Provisional application No. 62/634,782, filed on Feb. 23, 2018.

(56) References Cited

U.S. PATENT DOCUMENTS

| | | | |
|---|---|---|---|
| 9,621,547 | B2 | 4/2017 | Sharaga et al. |
| 9,715,597 | B2 | 7/2017 | Smith et al. |
| 9,798,559 | B2 | 10/2017 | Shah et al. |
| 10,027,678 | B1 | 7/2018 | Brandwine et al. |
| 2005/0108532 | A1 | 5/2005 | Bajikar |
| 2009/0240923 | A1 | 9/2009 | Covey et al. |
| 2011/0003580 | A1 | 1/2011 | Belrose et al. |
| 2013/0061313 | A1 | 3/2013 | Cullimore et al. |
| 2014/0095890 | A1 | 4/2014 | Mangalore et al. |
| 2014/0317686 | A1 | 10/2014 | Vetillard |
| 2015/0199515 | A1* | 7/2015 | Qureshi ............... G06F 21/563 726/22 |
| 2015/0310427 | A1* | 10/2015 | Yi ........................ G06F 21/83 705/64 |
| 2016/0065376 | A1 | 3/2016 | Smith et al. |
| 2016/0127417 | A1 | 5/2016 | Janssen |
| 2016/0149921 | A1 | 5/2016 | Potlapally et al. |
| 2016/0162858 | A1 | 6/2016 | Winograd et al. |
| 2016/0182531 | A1 | 6/2016 | Rubakha et al. |
| 2016/0330172 | A1 | 11/2016 | Muttik |
| 2017/0026181 | A1 | 1/2017 | Chhabra et al. |
| 2017/0054563 | A1 | 2/2017 | Verma |
| 2017/0093915 | A1 | 3/2017 | Ellis et al. |
| 2018/0211054 | A1* | 7/2018 | Costa ................. G06F 21/6218 |
| 2019/0266330 | A1 | 8/2019 | Thaler et al. |
| 2019/0268311 | A1 | 8/2019 | Mihai et al. |
| 2019/0272162 | A1* | 9/2019 | Couillard ................. G06F 8/60 |

OTHER PUBLICATIONS

"Non-Final Office Action Issued in U.S. Appl. No. 15/958,993", dated Apr. 10, 2020, 20 pages.

Beekman, Jethro Gideon, "Improving Cloud Security using Secure Enclaves", In a Dissertation Submitted in Partial Satisfaction of the requirements for the degree of Doctor of Philosophy in Engineering—Electrical Engineering and Computer Sciences, University of California, Berkeley, Jan. 1, 2016, 71 Pages.

Neubauer, et al., "A Roadmap for Personal Identity Management", In Proceedings of Fifth International Conference on Systems, Apr. 11, 2020, pp. 134-139.

"International Search Report and Written Opinion Issued in PCT Application No. PCT/US20/020243", dated Jun. 8, 2020, 10 Pages.

Rijswijk-Deij, et al., "Using Trusted Execution Environments in Two-factor Authentication: comparing approaches", In Proceedings of Open Identity Summit (Sep. 2013) (12 pages total).

Atamli-Reineh, et al., "A Framework for Application Partitioning using Trusted Execution Environments", In Publication of Concurrency and Computation: Practice and Experience, vol. 29, Issue 23 (Dec. 10, 2017) (23 pages total).

Noubir, et al., "Trusted Code Execution on Untrusted Platforms Using Intel SGX" In Proceedings of Virus Bulletin Conference (Oct. 2016) (7 pages total).

"Non Final Office Action Issued in U.S. Appl. No. 15/934,489", dated Feb. 22, 2021, 14 Pages.

"Final Office Action Issued in U.S. Appl. No. 15/934,489", dated Sep. 21, 2021, 15 Pages.

* cited by examiner

SECURE POLICY INGESTION INTO TRUSTED EXECUTION ENVIRONMENTS

CROSS-REFERENCE TO RELATED APPLICATIONS

This is a continuation-in-part application of and claims benefit and priority to U.S. Non-Provisional Ser. No. 15/958,993 filed Apr. 20, 2018, entitled "Secure Confirmation Terminal within a Trusted Cyber Physical System," which is a continuation-in-part of and claims benefit and priority to U.S. Non-Provisional Ser. No. 15/934,489 filed Mar. 23, 2018, entitled "Trusted Cyber Physical System," which claims benefit and priority to U.S. Provisional Application Ser. No. 62/634,782 filed Feb. 23, 2018, entitled "Trusted Cyber Physical System," the disclosure of each application is incorporated herein by reference in its entirety. This is a continuation-in-part application of and claims benefit and priority to U.S. Non-Provisional Ser. No. 15/934,489 filed Mar. 23, 2018, entitled "Trusted Cyber Physical System," which claims benefit and priority to U.S. Provisional Application Ser. No. 62/634,782 filed Feb. 23, 2018, entitled "Trusted Cyber Physical System," the disclosure of each application is incorporated herein by reference in its entirety.

BACKGROUND

A trusted execution environment (TEE) using public/private key pairs provides a secure space for data and code execution with a higher level of security than a traditional rich execution environment that is outside the TEE (and thus considered untrusted). Code, data, policies, and the like (termed "compositions") that are used, executed, and/or consumed in a given runtime TEE are conventionally authored in an environment that includes untrusted computing platforms with peripherals such as input and display devices (e.g., mouse, keyboard, monitor, etc.).

These untrusted authoring environments can provide paths for malicious code to be incorporated into a composition without knowledge of the author. For example, an authoring tool running on an untrusted computing platform may be compromised with malware that generates compositions having malicious content while appearing normal to the author with the expected appearance on a display and expected behaviors in response to inputs. The tainted composition may then be unknowingly ingested into a runtime TEE and thereby compromise its trusted functionalities.

SUMMARY

Compositions can be securely ingested into a runtime TEE by segmenting the authoring environment into two parts—an untrusted computing platform conventionally utilized by an author to create a composition, and an authoring TEE where the composition can be verified. The authoring TEE can enable the author (or another person) to verify that the composition accurately conforms with the author's intentions and does not include any unintended elements that may have been added by malware running on the untrusted computing platform. Once verified, the composition can be signed by the author in the authoring TEE using its private key and provided to the runtime TEE for secure ingestion as a trusted composition.

The verification supported in the authoring TEE uses secure I/O (input/output) between a trusted processor and trusted peripherals that include a display device and an input device. Other trusted peripherals for user identification such as fingerprint and smart card readers can also be utilized in the authoring TEE to support multi-factor authentication of the author. The input device is specifically configured with limited functionality to keep its device driver compact (the display driver can also be configured to be compact). For example, the input device may only include functionality for display navigation (e.g., "up," "down," "right," "left," etc.) and provide purposefully limited user input (e.g., "yes" and "no" or "accept" and "cancel," etc.).

The limited user input supported in the authoring TEE ensures that only verification of the integrity of the composition can be performed. No functionalities to edit, augment, or modify the composition are provided in the authoring TEE. For example, the author can scroll or page through a composition on the display using the input device to inspect and confirm integrity (the display can be configured as a large format device without negative impact on driver size in typical implementations). The composition can then be signed (e.g., using the "yes" button) with a key in the authoring TEE as a trusted composition if the verification is successful, or rejected (e.g., using the "no" button) if the author believes that the composition is compromised or is otherwise untrustworthy.

The small input device and display device drivers enable the code executing inside the TEE to be kept compact which increases overall performance of the verification segment in the authoring TEE while reducing the vulnerability to outside threats (i.e., a smaller execution space provides less opportunities for malicious code to hide and improves detection of such code). By purposely enabling the composition to be generated on the conventional untrusted computing platform, comprehensive performant functionality can be provided to the author including well known authoring tools plus a range of peripheral devices that can be tailored to a particular composition authoring job at hand. Thus, complicated code and associated hardware for composition creation function outside the authoring TEE, while the code and hardware for the composition verification, which are relatively small, function inside. The segmented authoring solution is thereby enabled at a lower cost compared to solutions that attempt to support the entire computing platform and I/O within the context of a TEE.

In cases when a composition needs to be transformed into human-consumable form from some other non-readable format, a transforming functionality can be instantiated in the authoring TEE, or distributed to another external TEE (e.g., a transforming TEE that is configured as a cloud resource). That way, the verified human-consumable composition is appropriately verified when ingested into the runtime TEE. In other scenarios, the composition may be transformed from human-consumable form into machine-consumable form for execution by the runtime TEE.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various

DETAILED DESCRIPTION

Figure 1:
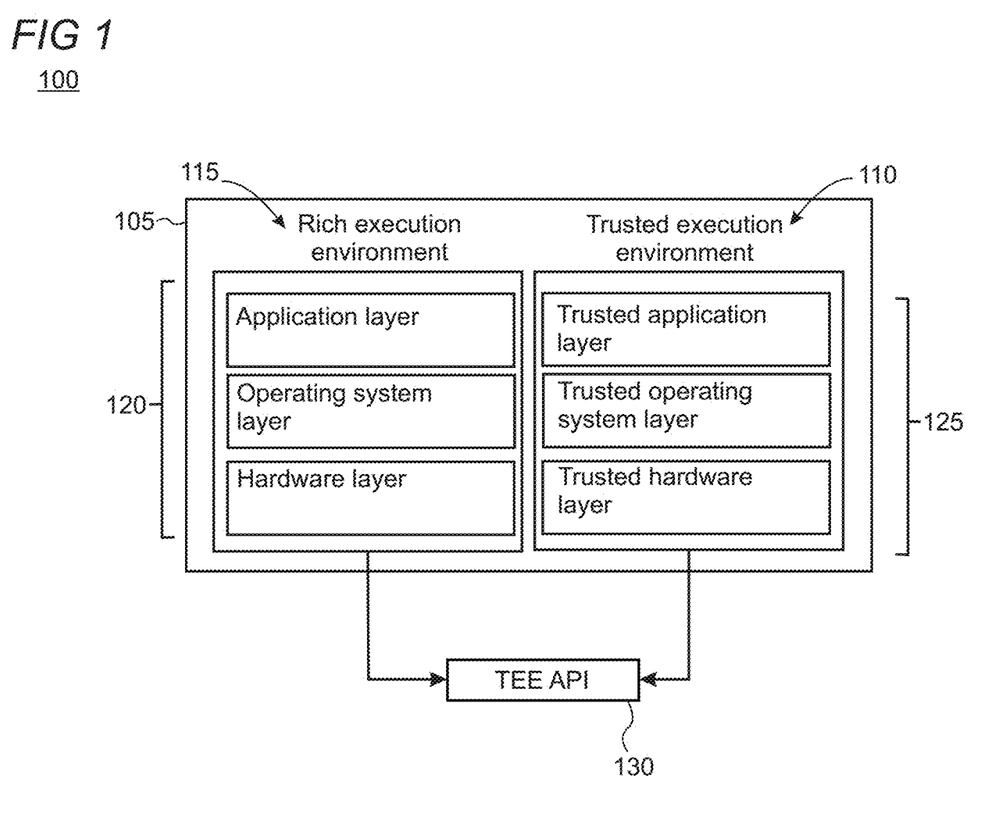
FIG. 1 shows an illustrative architecture with a rich execution environment (REE) and a trusted execution environment (TEE)

FIG. 1 shows an illustrative architecture 100 of a computing device 105 having a rich execution environment (REE) 115 running parallel to a trusted execution environment (TEE) 110. The REE may be subjected to additional exposure and security risks. In contrast, the TEE may operate securely in isolation from the REE to perform operations that are of a more sensitive nature. Such sensitive operations can include the handling of confidential personal information, banking data, the control of systems such as critical infrastructure, and composition verification, as discussed in further detail below.

As illustratively shown in FIG. 1, the REE and the TEE include conventional computing configurations to perform various operations. In simplified form, the REE and TEE each include application, operating system, and hardware layers (collectively represented by numerals 120 and 125), although the TEE is isolated and the hardware and software therein are considered trusted. The TEE and REE can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized (e.g., such that the TEE can be enforced using hardware so that malware that is attempted to be injected into the TEE via a buffer overrun cannot be executed by the secure processor), and any data inside the TEE cannot be read by code outside the TEE.

The application layers support various applications that are executable by the operating system. The REE application layer can support applications such as a browser, messaging applications, and the like, whereas the application layer in the TEE can support trusted applications. In a system dedicated for critical infrastructure, the trusted applications can include a trusted application gateway which monitors and controls all transmissions that seek to traverse the TEE, thereby allowing or denying access. Other exemplary environments can include banking and finance in which processed transactions and associated personal customer information are executed, for example, by a trusted banking application executing in the TEE.

The operating system layers can manage system operations in which the hardware and application layers operate. In the REE, the operating system (OS) can include Windows®, whereas the TEE can run a secure OS which runs parallel to the REE OS. The OS layers can each support a TEE application programming interface (API) 130 which provides the interoperability of the two environments. That is, a client TEE API in the REE can be used to commence a session with the TEE and thereby allow the TEE to execute a trusted application.

Figure 2:
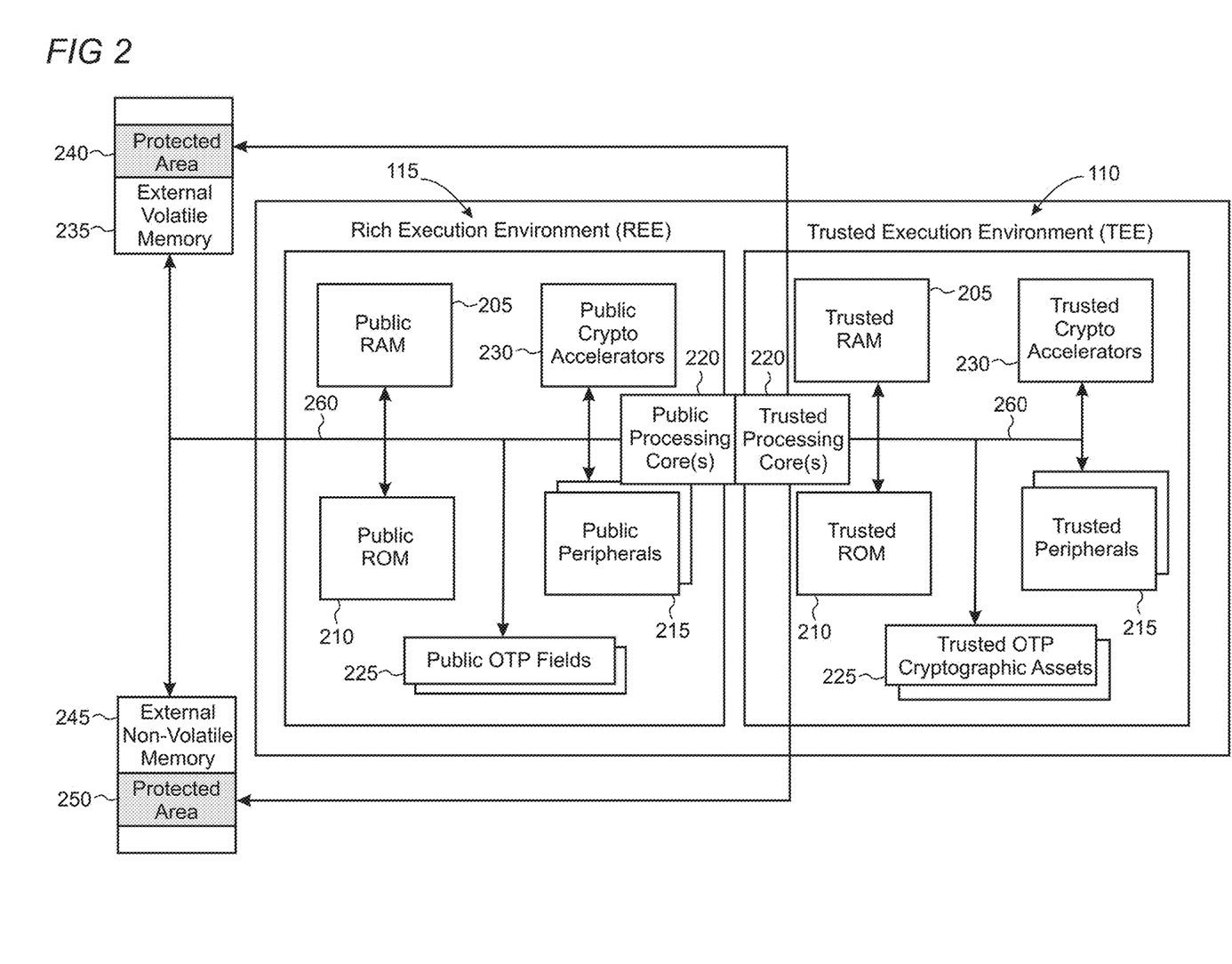
FIG. 2 shows an illustrative hardware architecture of the rich execution environment and the trusted execution environment.

The hardware layers support processors and memory, as depicted in FIG. 2. Although the REE and TEE are illustratively shown as operating distinctly from each other, the various hardware components can be partitioned such that portions of the hardware are dedicated for only public operations, and portions of the hardware are dedicated for only trusted operations. This partitioning of the components and system provide the secure isolation offered by the TEE.

FIG. 2 shows exemplary hardware of the computing device 105, which utilizes the REE 115 and TEE 110. As shown, the hardware components can be partitioned to isolate the TEE from the REE. The REE and TEE each include similar components which operate distinctly from the other environment. As illustratively shown, the various components include random access memory 205, read-only memory 210, peripherals 215 (e.g., input/output devices), processing core(s) 220, one-time password (OTP) fields 225, and crypto accelerators 230. In one exemplary embodiment, the REE can utilize external volatile memory 235 and external non-volatile memory 245, and a portion of the memories can have a protected area dedicated exclusively for the TEE, as representatively illustrated by numerals 240 and 250. The diagrams illustrated in FIGS. 1 and 2 are illustrative only, and other configurations that satisfy the secure environment offered by the TEE are also possible.

Figure 3:
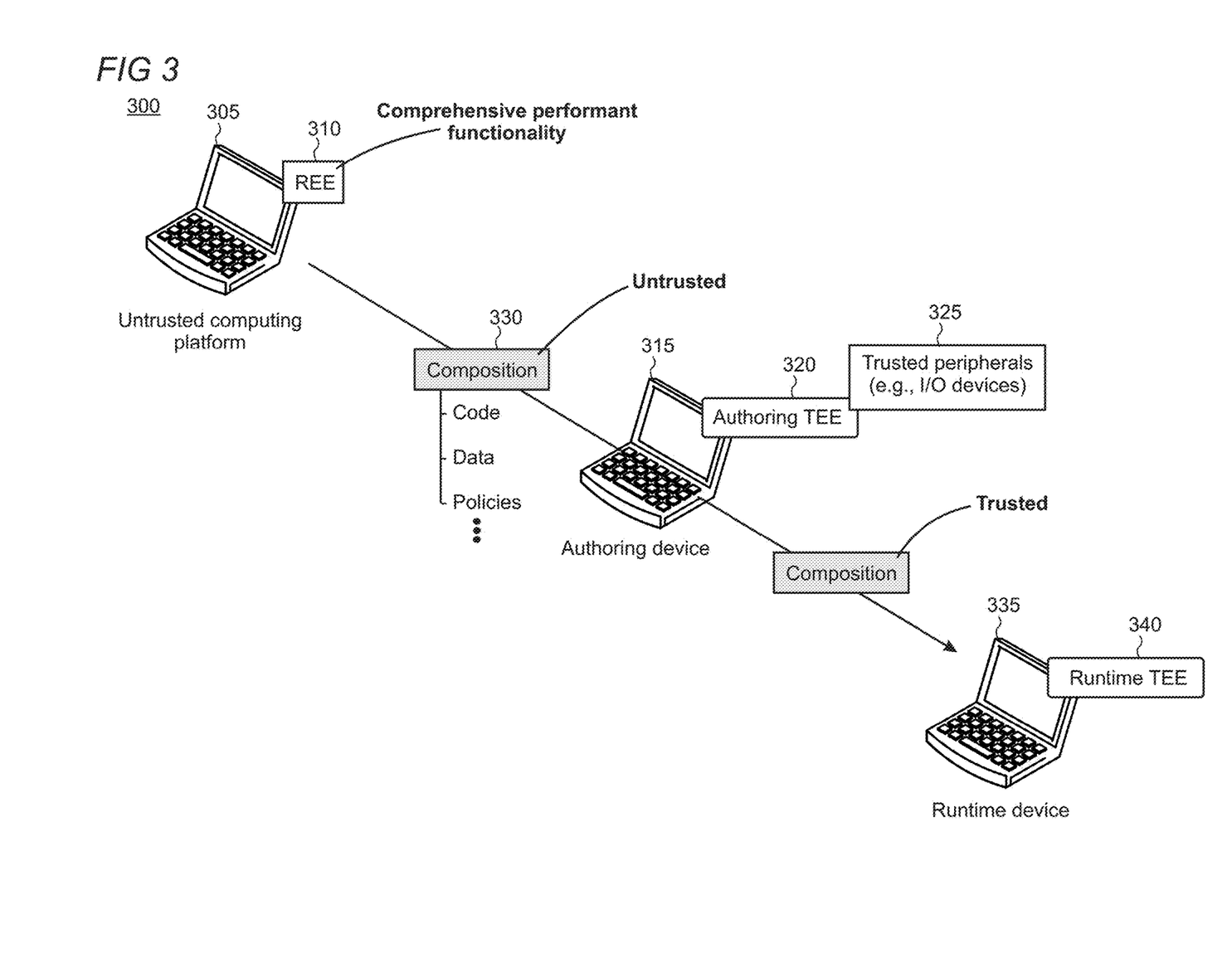
FIG. 3 shows an illustrative environment in which a composition is verified at an authoring TEE before being executed by the runtime TEE.

FIG. 3 shows an illustrative environment 300 that depicts the high-level communication path of a generated composition 330 from an untrusted computing platform 305 using an REE 310. The REE may be utilized due to the comprehensive performant functionality that is provided to a user when working on the composition, including well known authoring tools and a range of peripheral devices that can be tailored to a particular composition at hand. These components may otherwise not be available to the user when operating within a TEE. As a result, the composition, which can include code, data, policies, or other files, may be untrusted as illustratively shown in FIG. 3.

The various devices can communicate over a network (not shown), which may include a personal area network, local area network, wide area network, or the Internet. The composition 330 may be transmitted to the authoring TEE 320 operating on the authoring device 315. The authoring TEE is connected with one or more trusted peripherals (e.g., I/O devices) 325 that enable exposure, review, and approval or denial of the composition 330 by a user. If the user approves the composition, then it is sent to the runtime TEE 340 operating on a runtime device 335 since the composition is verified and trusted. As discussed in further detail below, the authoring TEE signs the composition with a private key to indicate to the runtime TEE that the composition has been reviewed and is trusted. The authoring of compositions is therefore segmented into two distinct parts, an untrusted computing platform where compositions are generated and an authoring device where the generated compositions are verified.

Figure 4:
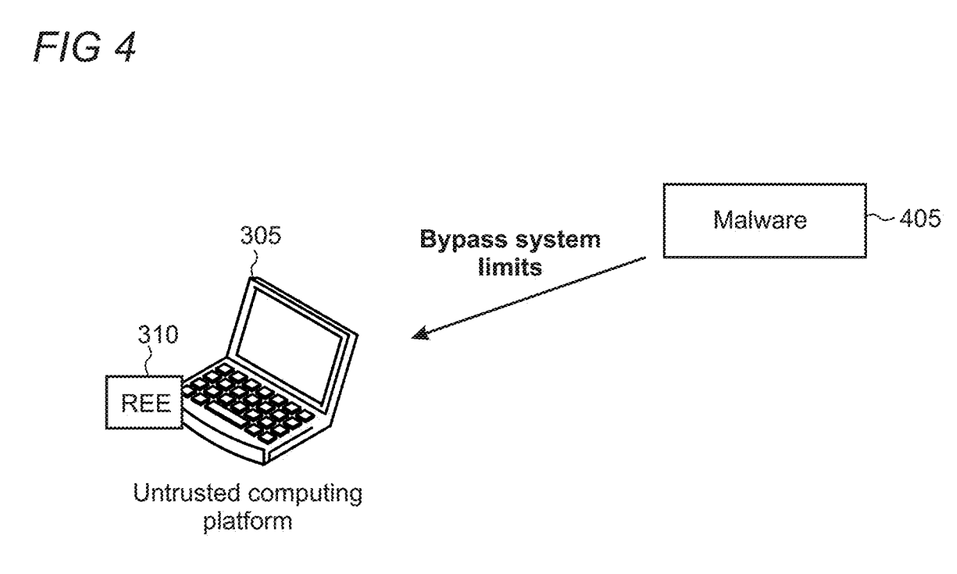
FIG. 4 shows an illustrative scenario where an untrusted computing platform is susceptible to malware.
Figure 5:
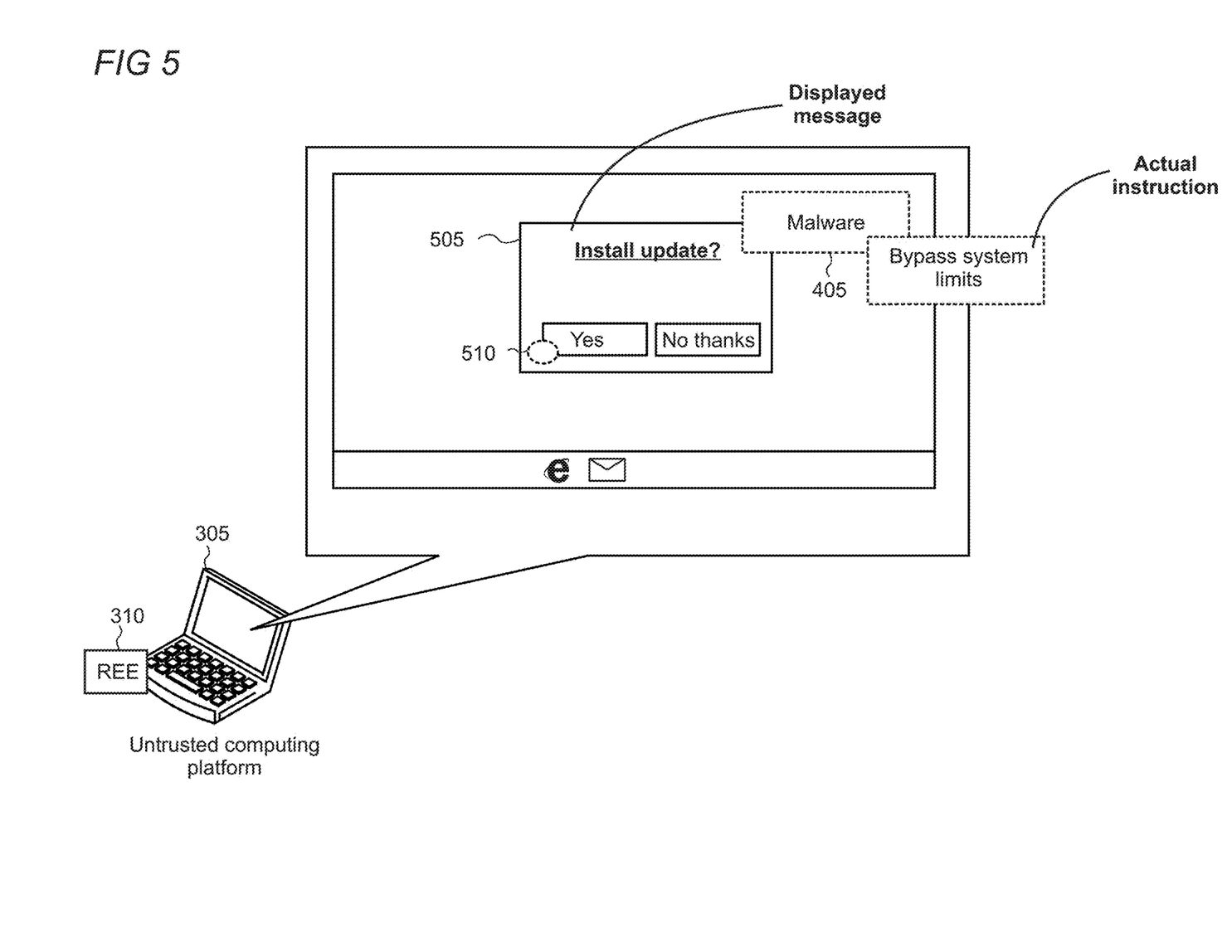
FIG. 5 shows an illustrative user interface which is infected with malware.

FIG. 4 shows an exemplary diagram of the untrusted computing platform 305 that is susceptible to malware 405. In this example, the malware is configured to trick the untrusted computing platform into transmitting an operational instruction to the runtime device to bypass system limits. FIG. 5 shows an illustrative user interface in which a dialog box 505 inquires whether the user would like to install an update and the user selects "Yes", as representatively shown by numeral 510. The displayed message to install an update, however, shields the actual instruction to bypass system limits at the runtime device as injected by the malware 405. Thus, the user's approval to install the update transmitted a message destined for the runtime device to bypass its system limits beyond safety regulations, such as by increasing or decreasing temperature, revolutions per minute, acceleration, etc. In the scenario in which the remote device stores private information, the malware may generate, for example, an unauthorized request for private information.

Figure 6:
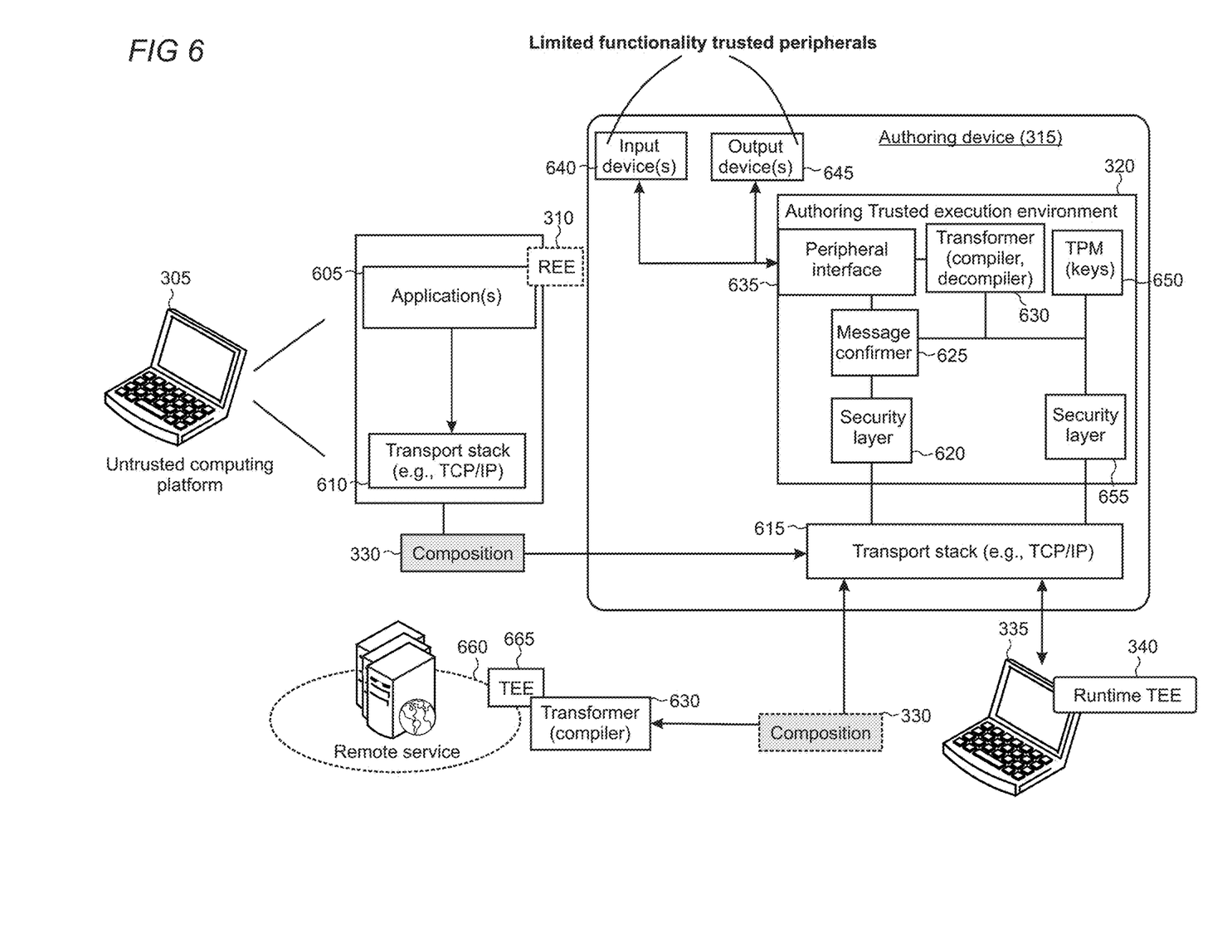
FIG. 6 shows an illustrative environment in which trusted peripheral devices are utilized with the authoring TEE for an author to approve or deny compositions.

FIG. 6 shows an illustrative environment in which the composition 330 from the untrusted computing platform 305 is received at the authoring TEE 320 of the authoring device 315. The untrusted computing platform includes one or more applications maintained at an application layer 605 configured to operate and communicate with other devices on the network such as the authoring device 315 and runtime device 335. Transmission of the composition may be performed, for example, using SNMP (Simple Network Management Protocol), HTTP (HyperText Transfer Protocol), etc.

The composition 330 is transmitted by a transport stack 610 (e.g., TCP/IP stack), where a transport stack 615 at the authoring device 315 breaks down the message for use by the TEE. A TEE API call may be utilized to facilitate the communications from the REE to the TEE. The security layer 620 is used to decrypt the transmission. For example, although the security layer can depend on the protocol, SSL (Secure Sockets Layer) is one example of a security layer which is configured to decrypt the message or transmission. The composition is therefore only in decrypted form within the TEE which is inaccessible from the REE of the authoring device.

After decryption, the composition traverses through the TEE and is examined by a message confirmer 625 which communicates with the trusted peripheral interface 635 and outputs the composition 330 for exposure, review, and approval or denial by a user using the trusted peripheral devices 640 and 645. While the trusted peripheral devices 640 and 645 are illustrated as being distinct devices, in some embodiments they may be combined devices such as a touch screen monitor. If the composition is authorized by the user, then the message is forwarded for execution by the runtime device 335. The composition may be signed by a key maintained by the trusted platform module (TPM) 650, encrypted by the security layer 655, and then assembled by the transport stack 615 for transmission to the runtime TEE 340 of the runtime device 335. If the user denies the composition (e.g., if after review, the composition appears compromised with malware), then the composition is suppressed and not forwarded for execution by the runtime TEE.

In some scenarios, the composition 330 may be in executable form for execution by the runtime environment or in some other format that is less easily verified. A transformer (e.g., compiler or decompiler depending on the scenario) 630 may transform the message into a different format (e.g., human-consumable form) for exposure on the trusted peripheral devices 640 and 645. This way the user can review the human-prepared or otherwise consumable form of the composition to further increase security and control over the executable composition. The transformer may also be used to compile the composition into machine-consumable form after it has been verified by a user. The compiler may be used when the runtime device is configured to execute machine-consumable compositions.

In other scenarios, a remote service 660, configured with a TEE 665 and transformer 630, may be utilized to transform the composition from machine-consumable form to human-consumable (e.g., human-readable) form using a decompiler. The decompiled composition is then securely transmitted back to the authoring TEE for exposure and review by the user. In other scenarios, the remote service may be configured to transform a composition from human-consumable form into machine-consumable form using a compiler. The remote service's compiler may be used after the composition has been verified and approved by the user and transmitted back to the authoring device so the runtime device can ingest the machine-consumable composition. Utilization of and interoperability with the remote service can enable and/or enhance the transformation functionality for the authoring device which may not have specific transformation capabilities.

Figure 7:
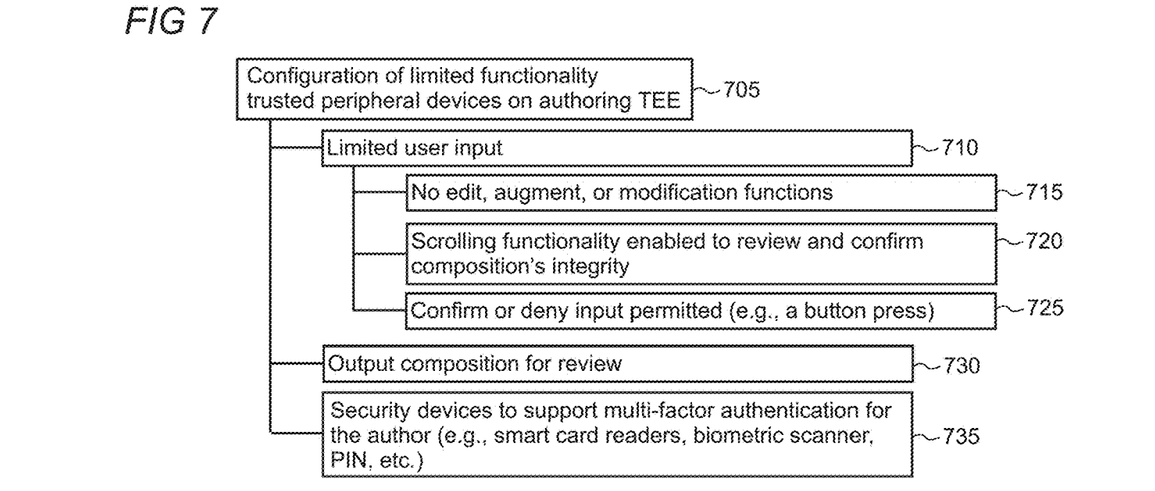
FIG. 7 shows a taxonomy of configurations for the trusted peripheral devices.

The trusted peripheral devices 640 and 645 may be configured with limited functionality to ensure the integrity of the authoring TEE 320. FIG. 7 shows a taxonomy of illustrative limited function configurations of the trusted peripheral devices associated with the authoring TEE, as illustratively shown by numeral 705. For example, the limited functionality can include limited user input 710 which can include no edit, augment, or modification functions 715, scrolling functionality to review and confirm composition's integrity 720, and confirm or deny input permissions (e.g., a button press) for user approval 725. The trusted peripheral devices may be configured to output the composition for review 730 and connections to security devices to support multi-factor authentication for the author (e.g., smart card reader, biometric scanner, PIN, etc.) 735.

Figure 8:
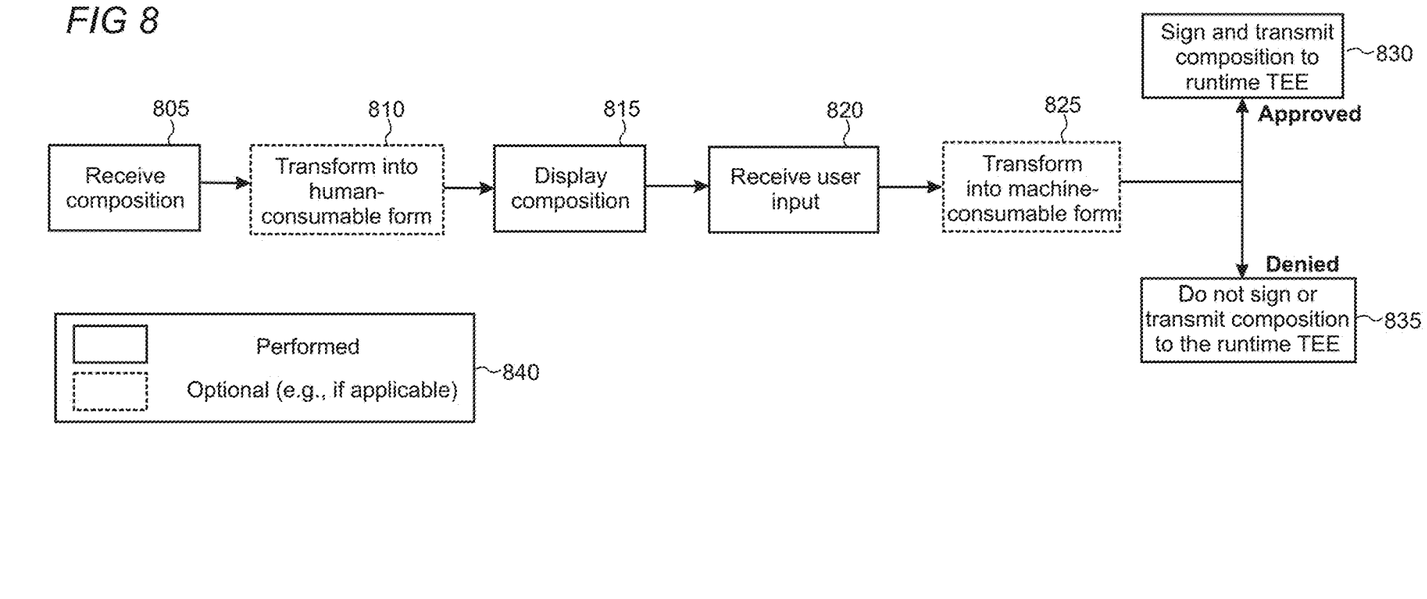
FIG. 8 shows an illustrative flowchart in which the authoring TEE approves or denies compositions.

FIG. 8 shows an illustrative flowchart of functionality of the authoring TEE 320. Reference table 840 shows which steps are necessarily performed and which steps are optional (e.g., if applicable) in the process. In step 805, the authoring TEE receives the composition 330 from an untrusted computing platform 305. In step 810, if applicable the received composition is transformed into human-consumable form. The composition may be transformed using a decompiler so the composition can be displayed and reviewed by the user in an understandable form. This may be, for example, the form in which the composition was originally created in the REE. If the composition is received at the authoring TEE in some executable form which is not consumable for a person, then the composition may be transformed into the human-consumable form for verification. This step is optional based on its applicability, that is, some compilations may be received in human-consumable form for which transformation is unnecessary.

In step 815, the authoring TEE displays the composition using trusted peripheral devices 640 and 645. In step 820, the authoring TEE receives user input at the trusted peripheral device. In step 825, if applicable, the compilation is transformed into machine-consumable form, such as using a compiler. This may occur, for example, if the compilation is in human-consumable form and not executable by the runtime device. In some scenarios, the runtime device can utilize the human-consumable form using an interpreter, and therefore the compilation is not compiled for execution. That is, the human-consumable form exposed to the user on the trusted peripheral device is the same form utilized by the runtime device.

In step 830, responsive to user approval of the composition, the authoring TEE signs the composition with a private key and then transmits the composition to the runtime TEE 340 operating on a runtime device 335. In step 835, responsive to user denial of the composition, the authoring TEE does not sign or transmit the composition to the runtime TEE.

Figure 9:
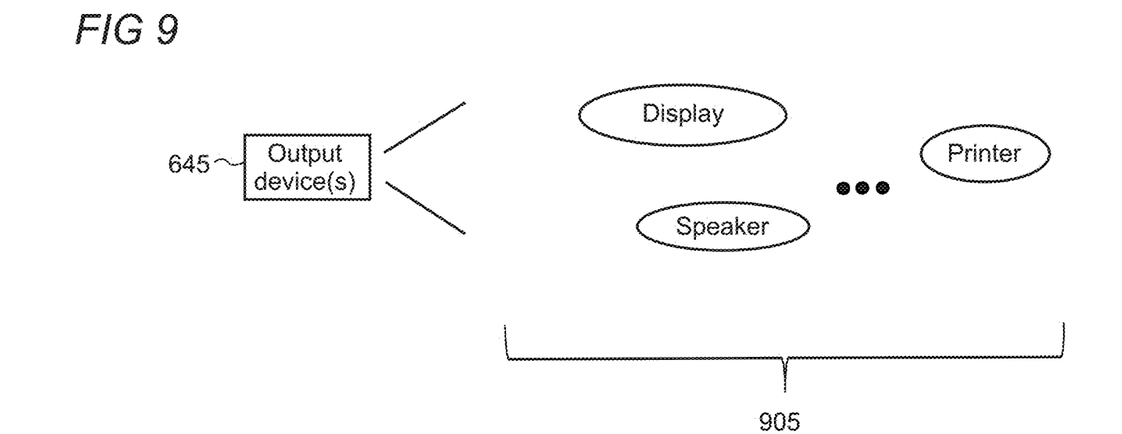
FIGS. 9 and 10 show illustrative types of input and output devices in communication with the authoring device.
Figure 10:
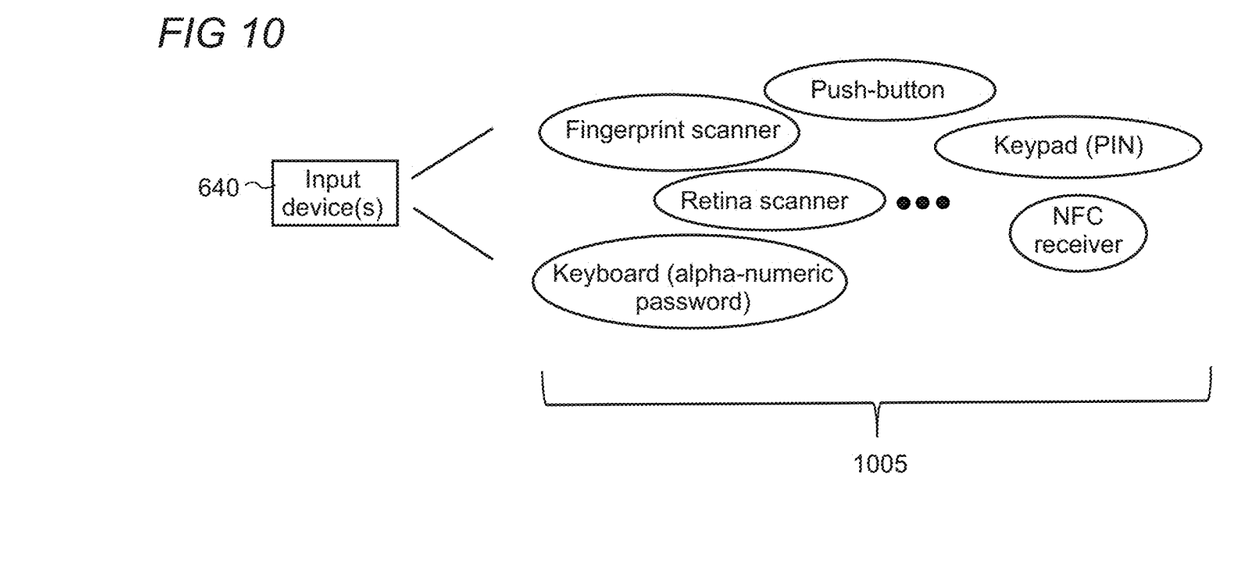

FIGS. 9 and 10 show respective output and input devices 645 and 640 which may be utilized as the trusted peripheral devices with the authoring TEE. Exemplary and non-exhaustive output devices can include a display, a speaker, or a printer, individually and collectively represented by numeral 905. Exemplary and non-exhaustive input devices can include a simple push-button, fingerprint scanner, retina scanner, keyboard (e.g., for an alpha-numeric password), keypad (e.g., for a numeral PIN), and an NFC (near-field communication) receiver, individually and collectively represented by numeral 1005. The NFC receiver may be pre-configured to recognize and receive authorization from a portable device, such as a user's smart card.

Figure 11:
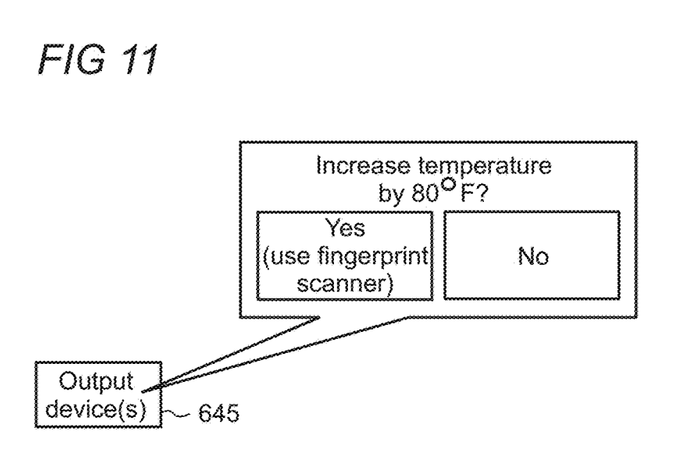
FIG. 11 shows an illustrative user interface in which a trusted peripheral device is configured to authorize or deny a composition responsive to a user's input.

FIG. 11 shows an illustrative I/O device (e.g., a touchscreen monitor) configured as a trusted peripheral device with the authoring TEE. In this embodiment, a policy to increase temperature by 80° F. can be permitted or rejected by the user. Selection of "Yes" or "No" respectively approves or denies the displayed composition.

Figure 12:
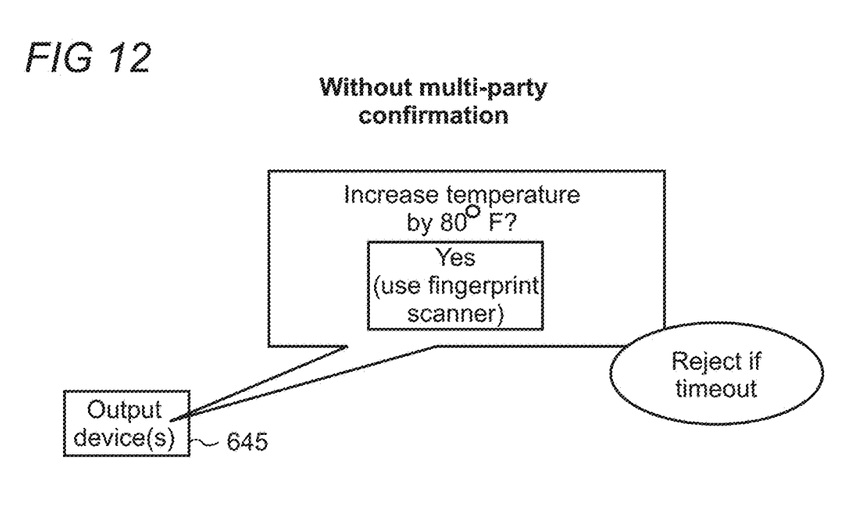
FIG. 12 shows an illustrative user interface in which a trusted peripheral device is pre-configured with a timeout mechanism if a user fails to approve a composition.

As another embodiment, FIG. 12 shows the illustrative I/O device which only includes an instruction to use the fingerprint scanner to confirm the transmission. In this scenario, if the user does not confirm the transmission using the fingerprint scanner, then after a predetermined time-period, the message is rejected and not forwarded to the runtime TEE. The input device may be configured to transmit a signal indicating the timeout to the secure terminal, or the secure terminal may be configured with its own timeout mechanism when confirmation is not timely received.

Figure 13:
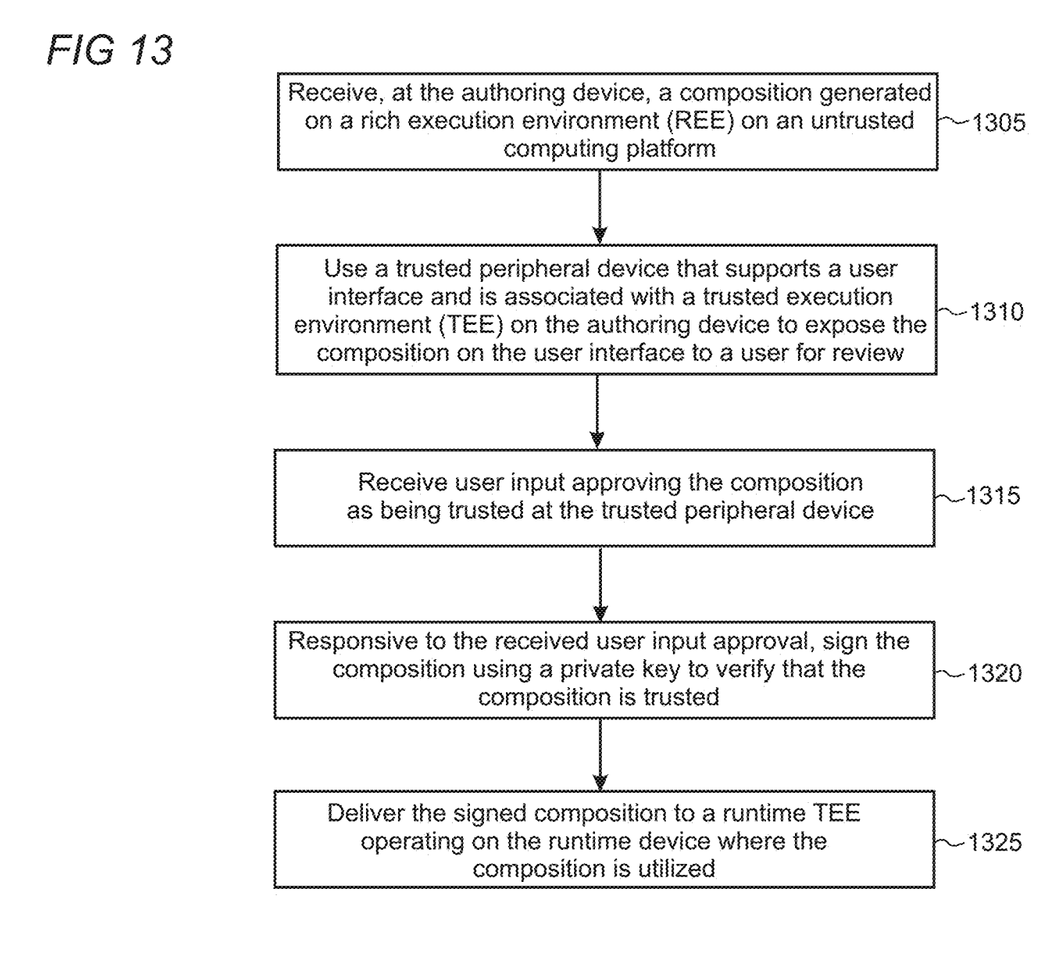
FIG. 13 shows a flowchart of an illustrative method performed by an authoring device.

FIG. 13 shows a flowchart of an illustrative method which may be implemented in an authoring device. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1305, the authoring device receives a composition generated on a rich execution environment on an untrusted computing platform, in which the composition is generated for utilization on a runtime device. In step 1310, the authoring device uses a trusted peripheral device that supports a user interface and is associated with a trusted execution environment (TEE) on the authoring device to expose the composition on the user interface to a user for review. In step 1315, the trusted peripheral device receives user input that approves the composition as being trusted. In step 1320, responsive to the received user input approval, the authoring device signs the composition using a private key to verify that the composition is trusted. In step 1325, the authoring device delivers the signed composition to a runtime TEE operating on the runtime device where the composition is utilized.

Referring back to FIG. 2, the system architecture shown therein can describe a device capable of executing the various components described herein for the secure policy ingestion into trusted execution environments. Thus, the architecture may be adapted for an untrusted computing platform 305, authoring device, runtime device, or other computing device including a server computer, a desktop computer, a netbook computer, a tablet computer, and/or a laptop computer. The architecture may be utilized to execute any aspect of the components presented herein.

The architecture illustrated in FIG. 2 includes processing core(s) (e.g., Central Processing Unit(s)) 220, a system memory including a RAM 205 and a ROM 210, and a system bus 260 that couples the memory to the processing core(s). The components, such as the processing core(s), can be partitioned such that there is a public portion of the processing core(s) and a trusted portion of the processing core(s), or alternatively separate hardware can be dedicated to the REE or the TEE. A basic input/output system containing the basic routines that help to transfer information between elements within the architecture, such as during startup, is stored in the ROM 210. The architecture also shows exemplary volatile memory external to the device as representatively shown by numerals 235 and 240. In this example, the external volatile memory includes a dedicated protected area for use with the TEE. The architecture further includes a mass storage device (representatively shown as external non-volatile memory 245 and 250) for storing software code or other computer-executed code that is utilized to implement applications, the file system, and the operating system. In this example, the external non-volatile memory includes a dedicated protected area for use with the TEE. Alternatively, the mass storage device can be internal to the device.

The mass storage device is connected to the processing core(s) 220 through a mass storage controller (not shown) connected to the bus 260. The mass storage device and its associated computer-readable storage media provide non-volatile storage for the architecture.

Although the description of computer-readable storage media contained herein refers to a mass storage device, such as a hard disk or CD-ROM drive, it may be appreciated by those skilled in the art that computer-readable storage media can be any available storage media that can be accessed by the architecture.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Bluray, or other optical storage, magnetic cassette, magnetic tape, magnetic disk storage or other magnetic storage device, or any other medium which can be used to store the desired information and which can be accessed by the architecture. The computer-readable storage medium may consist of propagating signals and be non-transitory.

According to various embodiments, the architecture may operate in a networked environment using logical connections to remote computers through a network. The architecture may connect to the network through a network interface unit (not shown) connected to the bus 260. It may be appreciated that the network interface unit also may be utilized to connect to other types of networks and remote computer systems. The architecture also may include an input/output controller (not shown) for receiving and processing input from a number of other devices, including a keyboard, mouse, or electronic stylus (not shown in FIG. 2). Similarly, the input/output controller may provide output to a display screen, a printer, or other type of output device (also not shown in FIG. 2).

It may be appreciated that the software components described herein may, when loaded into the processing core(s) 220 and executed, transform the processing core(s) 220 and the overall architecture from a general-purpose computing system into a special-purpose computing system customized to facilitate the functionality presented herein. The processing core(s) 220 may be constructed from any number of transistors or other discrete circuit elements, which may individually or collectively assume any number of states. More specifically, the processing core(s) 220 may operate as a finite-state machine, in response to executable instructions contained within the software modules disclosed herein. These computer-executable instructions may transform the processing core(s) 220 by specifying how the processing core(s) 220 transitions between states, thereby transforming the transistors or other discrete hardware elements constituting the processing core(s) 220.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture in order to store and execute the software components presented herein. It also may be appreciated that the architecture may include other types of computing devices, including handheld computers, embedded computer systems, smartphones, and PDAs known to those skilled in the art. It is also contemplated that the architecture may not include all of the components shown in FIG. 2, may include other components that are not explicitly shown in FIG. 2, or may utilize an architecture completely different from that shown in FIG. 2.

Various exemplary embodiments of the present secure policy ingestion into trusted execution environments are now presented by way of illustration and not as an exhaustive list of all embodiments. An example includes a method to verify compositions within a trusted execution environment (TEE) of an authoring device, comprising: receiving, at the authoring device, a composition generated on a rich execution environment (REE) on an untrusted computing platform, the composition being generated for utilization on a runtime device; using a trusted peripheral device that supports a user interface and is associated with the TEE on the authoring device to expose the composition on the user interface to a user for review; at the trusted peripheral device, receiving user input approving the composition as being trusted; responsive to the received user input approval, signing the composition using a private key to verify that the composition is trusted; and delivering the signed composition to a runtime TEE operating on the runtime device where the composition is utilized.

In another example, the composition is any one of code, data, or policies. In another example, the method further comprises transforming the composition into human-consumable form and exposing the composition in human-consumable form on the trusted peripheral device. In another example, the method further comprises: forwarding the composition to a remote service, wherein the remote service is configured with a decompiler to transform the composition into human-consumable form; and receiving the transformed composition from the remote service for exposure on the trusted peripheral device. In another example, the method further comprises transforming the composition into machine-consumable form for delivery to and ingestion by the runtime device. In another example, the method further comprises: forwarding the composition to a remote service, wherein the remote service is configured with a compiler to transform the composition into machine-consumable form; and receiving the transformed composition from the remote service for delivery to and ingestion by the runtime device. In another example, the trusted peripheral devices include a security device unique to an authorized user to approve the composition, and the security device includes a fingerprint scanner, retina scanner, keypad for a personal identification number (PIN), near-field communication (NFC) receiver, or a keyboard for an alpha-numeric password. In another example, the trusted peripheral devices are configured with limited functionality of outputting the composition and receiving approval or denial input from a user, wherein limited functionality includes prohibiting editing, augmenting, or modification of compositions. In another example, the private key is associated with a trusted platform module (TPM) of the TEE, and the private key is unique to the TPM.

A further example includes an authoring device, comprising: one or more processors; and a hardware-based memory device comprising instructions which, when executed by the one or more processors operating in a trusted execution environment (TEE) of the authoring device, cause the authoring device to: receive, at the authoring device, a composition generated on a rich execution environment (REE) on an untrusted computing platform, the composition being generated for utilization on a runtime device; use a trusted peripheral device that supports a user interface and is associated with the TEE on the authoring device to expose the composition on the user interface to a user for review; at the trusted peripheral device, receive user input approving the composition as being trusted; responsive to the received user input approval, sign the composition using a private key to verify that the composition is trusted; and deliver the signed composition to a runtime TEE operating on the runtime device where the composition is utilized.

In another example, the composition is any one of code, data, or policies. In another example, the executed instructions further cause the authoring device to transform the composition into human-consumable form and expose the composition in human-consumable form on the trusted peripheral device. In another example, the executed instructions further cause the authoring device to: forward the composition to a remote service, wherein the remote service is configured with a decompiler to transform the composition into human-consumable form; and receive the transformed composition from the remote service for exposure on the trusted peripheral device. In another example, the executed instructions further cause the authoring device to transform the composition into machine-consumable form for delivery to and execution by the runtime device.

A further example includes one or more hardware-based non-transitory computer-readable memory devices storing instructions which, when executed by one or more processors disposed in an authoring device, cause the authoring device to: receive, at the authoring device, a composition generated on a rich execution environment (REE) on an untrusted computing platform, the composition being generated for utilization on a runtime device; use a trusted peripheral device that supports a user interface and is associated with the TEE on the authoring device to expose the composition on the user interface to a user for review; at the trusted peripheral device, receive user input approving the composition as being trusted; responsive to the received user input approval, sign the composition using a private key to verify that the composition is trusted; and deliver the signed composition to a runtime TEE operating on the runtime device where the composition is utilized.

In another example, the composition is any one of code, data, or policies. In another example, the executed instructions further cause the authoring device to transform the composition into human-consumable form and expose the composition in human-consumable form on the trusted peripheral device. In another example, the executed instructions further cause the authoring device to: forward the composition to a remote service, wherein the remote service is configured with a decompiler to transform the composition into human-consumable form; and receive the transformed composition from the remote service for exposure on the trusted peripheral device. In another example, the trusted peripheral devices are configured with limited functionality of outputting the composition and receiving approval or denial input from a user. In another example, the limited functionality includes prohibiting editing, augmenting, or modification of compositions.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method to verify compositions in an authoring trusted execution environment (TEE) that operates on an authoring device, comprising:
    receiving, at the authoring device, a composition generated on a rich execution environment (REE) on an untrusted computing platform, the composition being generated for utilization on a runtime device;
    using a trusted peripheral device that supports a user interface and is associated with the authoring TEE operating on the authoring device to expose the composition on the user interface to a user for review;
    at the trusted peripheral device, receiving user input approving the composition as being trusted;
    responsive to the received user input approval, signing the composition using a private key to verify that the composition is trusted; and
    delivering the signed composition to a runtime TEE operating on the runtime device where the composition is utilized.

2. The method of claim 1, in which the composition is any one of code, data, or policies.

3. The method of claim 1, further comprising transforming the composition into human-consumable form and exposing the composition in human-consumable form on the trusted peripheral device.

4. The method of claim 1, further comprising:
    forwarding the composition to a remote service, wherein the remote service is configured with a decompiler to transform the composition into human-consumable form; and
    receiving the transformed composition from the remote service for exposure on the trusted peripheral device.

5. The method of claim 1, further comprising transforming the composition into machine-consumable form for delivery to and ingestion by the runtime device.

6. The method of claim 1, further comprising:
    forwarding the composition to a remote service, wherein the remote service is configured with a compiler to transform the composition into machine-consumable form; and
    receiving the transformed composition from the remote service for delivery to and ingestion by the runtime device.

7. The method of claim 1, in which the trusted peripheral device includes a security device unique to an authorized user to approve the composition, and the security device includes a fingerprint scanner, retina scanner, keypad for a personal identification number (PIN), near-field communication (NFC) receiver, or a keyboard for an alpha-numeric password.

8. The method of claim 1, in which the trusted peripheral device is configured with limited functionality of outputting the composition and receiving approval or denial input from a user, wherein the limited functionality includes prohibiting editing, augmenting, or modification of compositions.

9. The method of claim 1, in which the private key is associated with a trusted platform module (TPM) of the authoring TEE, and the private key is unique to the TPM.

10. An authoring device, comprising:
    one or more processors; and a hardware-based memory device comprising instructions which, when executed by the one or more processors operating in an authoring trusted execution environment (TEE) that operates on the authoring device, cause the authoring device to:

receive, at the authoring device, a composition generated on a rich execution environment (REE) on an untrusted computing platform, the composition being generated for utilization on a runtime device;

use a trusted peripheral device that supports a user interface and is associated with the authoring TEE operating on the authoring device to expose the composition on the user interface to a user for review;

at the trusted peripheral device, receive user input approving the composition as being trusted;

responsive to the received user input approval, sign the composition using a private key to verify that the composition is trusted; and deliver the signed composition to a runtime TEE operating on the runtime device where the composition is utilized.

11. The authoring device of claim 10, in which the composition is any one of code, data, or policies.

12. The authoring device of claim 10, in which the executed instructions further cause the authoring device to transform the composition into human-consumable form and expose the composition in human-consumable form on the trusted peripheral device.

13. The authoring device of claim 10, in which the executed instructions further cause the authoring device to:
forward the composition to a remote service, wherein the remote service is configured with a decompiler to transform the composition into human-consumable form; and
receive the transformed composition from the remote service for exposure on the trusted peripheral device.

14. The authoring device of claim 10, in which the executed instructions further cause the authoring device to transform the composition into machine-consumable form for delivery to and execution by the runtime device.

15. One or more hardware-based non-transitory computer-readable memory devices storing instructions which, when executed by one or more processors disposed in an authoring device, cause the authoring device to:

receive, at the authoring device, a composition generated on a rich execution environment (REE) on an untrusted computing platform, the composition being generated for utilization on a runtime device;

use a trusted peripheral device that supports a user interface and is associated with an authoring trusted execution environment (TEE) that operates on the authoring device to expose the composition on the user interface to a user for review;

at the trusted peripheral device, receive user input approving the composition as being trusted;

responsive to the received user input approval, sign the composition using a private key to verify that the composition is trusted; and deliver the signed composition to a runtime TEE operating on the runtime device where the composition is utilized.

16. The one or more hardware-based non-transitory computer-readable memory devices of claim 15, in which the composition is any one of code, data, or policies.

17. The one or more hardware-based non-transitory computer-readable memory devices of claim 15, in which the executed instructions further cause the authoring device to transform the composition into human-consumable form and expose the composition in human-consumable form on the trusted peripheral device.

18. The one or more hardware-based non-transitory computer-readable memory devices of claim 15, in which the executed instructions further cause the authoring device to:
forward the composition to a remote service, wherein the remote service is configured with a decompiler to transform the composition into human-consumable form; and
receive the transformed composition from the remote service for exposure on the trusted peripheral device.

19. The one or more hardware-based non-transitory computer-readable memory devices of claim 15, in which the trusted peripheral device is configured with limited functionality of outputting the composition and receiving approval or denial input from a user.

20. The one or more hardware-based non-transitory computer-readable memory devices of claim 19, in which the limited functionality includes prohibiting editing, augmenting, or modification of compositions.

* * * * *